United States Patent
Posamentier et al.

(10) Patent No.: US 7,045,752 B2
(45) Date of Patent: May 16, 2006

(54) ILLUMINATED AND NON-ILLUMINATED PHOTODIODES FOR MONITORING AND CONTROLLING AC AND DC COMPONENTS OF A LASER BEAM

(75) Inventors: Joshua D. Posamentier, Oakland, CA (US); Peter E. Kirkpatrick, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 10/611,701

(22) Filed: Jun. 30, 2003

(65) Prior Publication Data

US 2004/0262491 A1 Dec. 30, 2004

(51) Int. Cl.
*G01J 1/32* (2006.01)
*H01J 40/14* (2006.01)

(52) U.S. Cl. .................. 250/205; 250/214 R

(58) Field of Classification Search ............ 250/214 R, 250/205
See application file for complete search history.

(56) References Cited

U.S. PATENT DOCUMENTS 5,371,360 A * 12/1994 Bardos et al. ............. 250/235

* cited by examiner

Primary Examiner—David Porta
Assistant Examiner—Pascal M. Bui-Pho
(74) Attorney, Agent, or Firm—Blakely, Sokoloff, Taylor & Zafman LLP

(57) ABSTRACT

Embodiments of the present invention utilize two photodiodes on the same substrate, one illuminated monitor photodiode to monitor an optical beam out of a back facet (or back scattered) of a laser, and one non-illuminated reference photodiode to characterize in real time radio frequency (RF) parameters/performance to control extinction ratio and optical modulation amplitude of the laser beam.

17 Claims, 4 Drawing Sheets

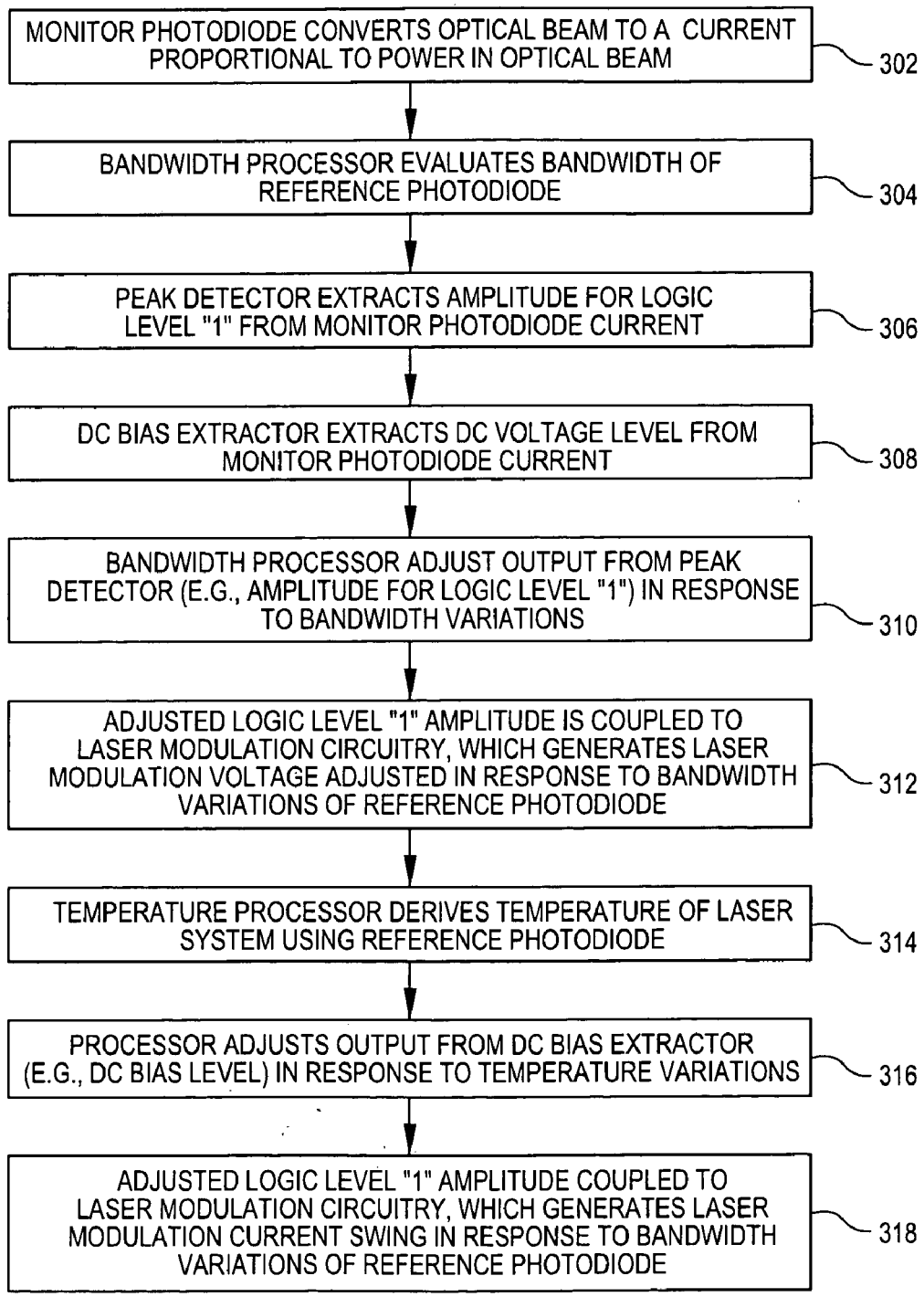

ILLUMINATED AND NON-ILLUMINATED PHOTODIODES FOR MONITORING AND CONTROLLING AC AND DC COMPONENTS OF A LASER BEAM

BACKGROUND

1. Field

Embodiments of the present invention relate to laser systems and, in particular, to temperature compensation in lasers systems and their associated control systems.

2. Discussion of Related Art

One link of an optical telecommunication system typically has a transmitter, an optical fiber, and a receiver. The transmitter has a light source, which converts an electrical signal into the optical beam and launches it into the optical fiber. There is information on a data stream in the electrical signal that is also modulated onto the optical beam. The optical fiber transports the optical beam to the receiver. The receiver converts the optical beam back into an electrical signal and recovers the information from the data stream. Laser systems, such as those that use distributed feedback (DFB) lasers, external cavity lasers (ECL), and vertical cavity surface emitting lasers (VCSELs), are common coherent light sources.

To ensure proper operation of any laser system, many of the parameters (e.g., power, channel, temperature) are controlled and monitored by control loops. One such control loop is an automatic power control loop, which is designed to maintain average optical power out of the laser constant, typically because as lasers age the power output at a given laser bias current decreases and as they change temperature, their slope efficiency changes, resulting in different amounts of light output for the same bias current.

A typical automatic power control loop includes a monitor photodiode positioned at the back facet of the laser to monitor the power output from the laser. The light in the optical beam emitted out of the back facet is either substantially the same as light in the optical beam emitted out of the front facet or has a known proportionality to light out of the front facet so that the monitor photodiode provides a good indication of the power in the optical beam light out of the front facet. The automatic power control loop adjusts the laser bias current in response to laser temperature changes and/or aging as sensed by the monitor photodiode.

The light emitted by the laser has what is sometimes called direct current (DC) components. The DC component of a high-speed laser is average optical power. Average optical power (AOP) is the average level of power in the optical beam over a time constant much longer than the period of one bit of data. However, optical receivers respond to signal swing rather than average optical power, which is not affected in a typical alternating current (AC) coupled laser system by adjusting the laser bias current in response to laser temperature changes and/or aging.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which:

FIG. 3 is a flowchart showing a method for operating the laser system depicted in FIG. 1 according to an embodiment of the present invention;

DETAILED DESCRIPTION OF THE ILLUSTRATED EMBODIMENTS

Figure 1:
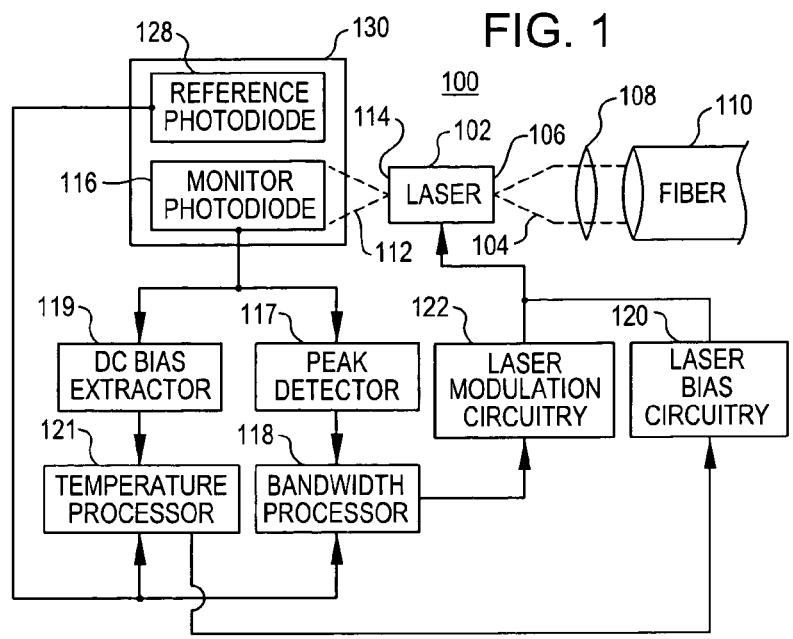
FIG. 1 is a high-level block diagram of a laser system according to embodiments of the present invention.

FIG. 1 illustrates a high-level block diagram of a laser system 100 according to an embodiment of the present invention. The example laser system 100 includes a distributed feedback (DFB) laser 102 that emits an optical beam 104 from a front facet 106. The laser 102 may be a directly modulated laser. A lens 108 focuses the optical beam 104 onto an optical fiber 110. There may be an optical isolator (not shown) positioned between the lens 108 and the optical fiber 110. The laser 102 also emits an optical beam 112 from a back facet 114. In one embodiment of the present invention, the optical beam 104 is substantially the same as the optical beam 112. In an alternative embodiment, the optical beam 104 has a known proportionality to the optical beam 112.

Figure 2:
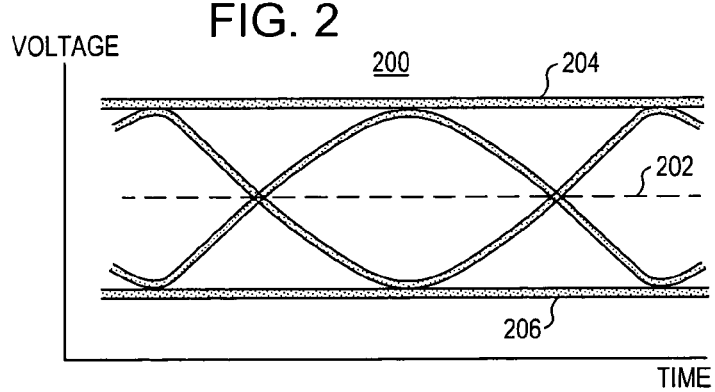
FIG. 2 is graphical representation of an optical beam (or "eye pattern") according to an embodiment of the present invention.

FIG. 2 is a graphical representation of the example optical beam 112 (or "eye pattern" 200) according to an embodiment of the present invention. An eye pattern is data bits acquired from the data stream in the optical beam 112 overlaid on top of each other so that overall quality and stability of a telecommunication system can be observed. Eye patterns allow such parameters as noise, jitter, rise times, fall times, pulse widths, etc., to be viewed.

In one embodiment of the present invention, the eye pattern 200 is acquired using any suitable known test instrumentation (e.g., an oscilloscope). The particular protocol (e.g., SONET, Ethernet, Fibre Channel) used determines how to analyze an eye pattern and associated test instrumentation.

The eye pattern 200 includes a direct current (DC) bias level 202, which is representative of the average optical power in the optical beam 112. The eye pattern 200 includes an amplitude 204, which is representative of a logic level "1" for the optical beam 112. The eye pattern 200 includes an amplitude 206, which is representative of a logic level "0" for the optical beam 112.

Referring back to the embodiment of FIG. 1, the example laser system 100 is an un-cooled laser system that includes circuitry to control AC components of an optical beam. One AC component is extinction ratio. Extinction ratio is the ratio of the optical power for the nominal logic "1" and logic "0" levels of an optical beam. Another AC component is optical modulation amplitude. Optical modulation amplitude (OMA) is the difference in optical power for the logic level "1" and logic level "0" levels of the optical beam.

The optical beam 112 is incident on a monitor photodiode 116 whose output is coupled to a peak detector 117. The output of the peak detector 117 is coupled to a bandwidth processor 118. The output of the bandwidth processor 118 is coupled to laser modulation circuitry 122. The output of the laser modulation circuitry 122 is coupled to the laser 102.

The monitor photodiode 116 output also is coupled to a DC bias extractor 119. The output of the DC bias extractor 119 is coupled to a temperature processor 121. The output of the temperature processor 121 is coupled to laser bias circuitry 120. The output of the laser bias circuitry 120 is coupled to the laser 102.

The monitor photodiode 116 along with a reference photodiode 128 are located on a substrate 130. The monitor photodiode 116 and the reference photodiode 128 are physically connected (on the same substrate 130) but are not electrically connected except to similar power supplies.

In embodiments of the present invention, the optical beam 112 does not illuminate the reference photodiode 128. This can be accomplished by positioning the reference photodiode 128 out of the path of the optical beam 112, as illustrated in FIG. 1. Alternatively, the reference photodiode 128 may have a material on its surface that reflects, absorbs, or otherwise prevents the reference photodiode 128 from responding to incident light. In one embodiment, gold or copper are sputtered on the surface of the reference photodiode 128 to reflect the optical beam 112.

The substrate 130 may be initially tuned for optimal frequency response at a particular bandwidth. The bandwidth of the substrate 130 changes as a function of temperature, however. As a result, the bandwidth of the monitor photodiode 116 changes as a function of temperature. When the temperature and as a result bandwidth change, it is difficult to evaluate and control the frequency response of the monitor photodiode 116. Embodiments of the present invention adjust the effective frequency response of the monitor photodiode 116 across temperature.

FIG. 3 is a flowchart showing a method 300 for operating the laser system 100 according to an embodiment of the present invention. A machine-accessible medium with machine-accessible instructions thereon may be used to cause a processor to perform the process 300 or portions thereof. Of course, the method 300 is only an example process and other processes may be used. The order in which they are described should not be construed to imply that these operations are necessarily order-dependent or that the operations be performed in the order in which the operations are presented.

In a block 302, the monitor photodiode 116 converts the optical beam 112 to a current proportional to the power in the optical beam 112. The monitor photodiode current is coupled to the peak detector 117.

In a block 304, the bandwidth processor 118 evaluates the bandwidth of the substrate 130, which has a capacitance 403 that is proportional it its (temperature and) bandwidth. Evaluating the bandwidth of the substrate 130 also evaluates the bandwidth of the reference photodiode 128 and the monitor photodiode 116.

Figure 4:
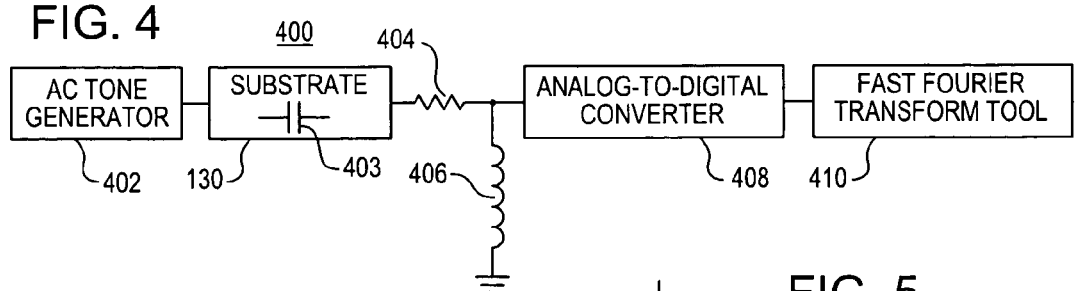
FIG. 4 is a schematic diagram of a circuit suitable for evaluating the bandwidth of the substrate depicted in FIG. 1 according to an embodiment of the present invention.

FIG. 4 is a schematic diagram of a circuit 300 suitable for evaluating the bandwidth of the substrate 130 according to an embodiment of the present invention in which an impulse response measurement (e.g., a time-domain responsivity pulses) is used. The circuit 400 includes an AC tone generator 402 coupled to the substrate 130. The substrate 130 is coupled to a resistor 404, which is coupled to a choke 406 and an analog-to-digital converter (ADC) 408. The ADC 408 is coupled to a fast Fourier transform tool 410.

In one embodiment, the AC tone generator 402 sends an AC tone through the substrate 130. The capacitance 403 shapes the AC tone in accordance with the bandwidth of the substrate 130. Because both the reference photodiode 128 and the monitor photodiode 116 are on the same substrate, their capacitances and thus bandwidths are substantially the same as that of the substrate 130.

The resistor 404 develops the shaped AC tone and the choke 406 shunts the DC voltage on the AC tone to ground. The ADC 408 converts the shaped AC tone to a digital value representative of the shaped AC tone. The FFT tool 410 performs a fast Fourier transform on the shaped AC tone so that the bandwidth of the substrate 128 can be evaluated in real time.

Figure 5:
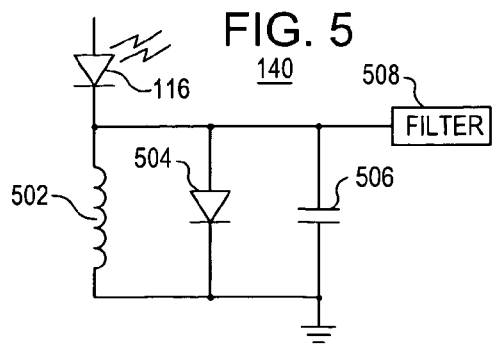
FIG. 5 is a schematic diagram of the peak detector depicted in FIG. 1 according to an embodiment of the present invention.

Returning back to the flowchart 300, in a block 306, the peak detector 140 extracts the amplitude for the logic level "1" from the monitor photodiode 116 current. FIG. 5 is a schematic diagram of the peak detector 140 according to an embodiment of the present invention. Current from the monitor photodiode 116 is coupled to an AC choke 502, which couples DC components (i.e., DC bias voltage) of the current to ground and allows AC components to pass to the rest of the peak detector 117 circuitry (e.g., modulation amplitude is coupled to a radio frequency (RF) diode 504, a capacitor 506, and a low pass filter 508.

The AC choke 502 may be create a low impedance DC path to ground but a high frequency open circuit to ground.

The RF diode 504 may be a high-speed Shottky diode that functions as an envelope or peak detector by essentially clipping negative voltage swings in the AC components.

The capacitor 506 captures the peaks of the negative voltage swings. The capacitor 506 value is selected for based on the desired peak detector 117 response, i.e., the low-frequency cutoff is selected based on the particular protocol (e.g., SONET, Ethernet, Fibre Channel) used to minimize pattern dependence.

The filter 508 filters mid to low frequency pattern induced ripples in the AC portion of the monitor photodiode 116 current. The filter 508 may be implemented in software, firmware, analog, microcontroller, etc., and after reading the description herein a person of ordinary skill in the relevant art will readily recognize how to implement the filter 508 in a variety of ways.

The peak detector 117 outputs a voltage proportional to the amplitude for the logic level "1" of the optical beam 112.

Figure 6:
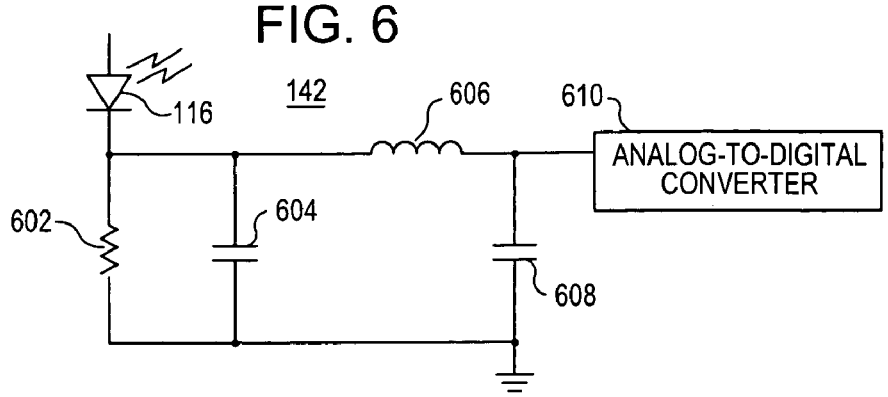
FIG. 6 is a schematic diagram of the DC bias extractor depicted in FIG. 1 according to an embodiment of the present invention.

Returning back to the flowchart 300, in a block 308, the DC bias extractor 119 extracts the DC (average) level of the optical signal 112 from the monitor photodiode 116 current. FIG. 6 is a schematic diagram of the DC bias extractor 119 according to an embodiment of the present invention. Current from the monitor photodiode 116 is coupled to a resistor 602 and a filter comprised of a capacitor 604, an inductor 606, and a capacitor 608. The resistor 602 develops a voltage from the current from the monitor photodiode 116. The filter filters out AC ripple in the voltage, leaving a DC voltage level. The DC voltage level is coupled to an analog-to-digital converter (ADC) 610, which converts the analog DC voltage to a digital value.

The output of the DC bias extractor 119 is the DC bias voltage in the optical beam 112. The DC bias voltage in the optical beam 112 is representative of the average optical power in the optical beam 112.

Figure 7:
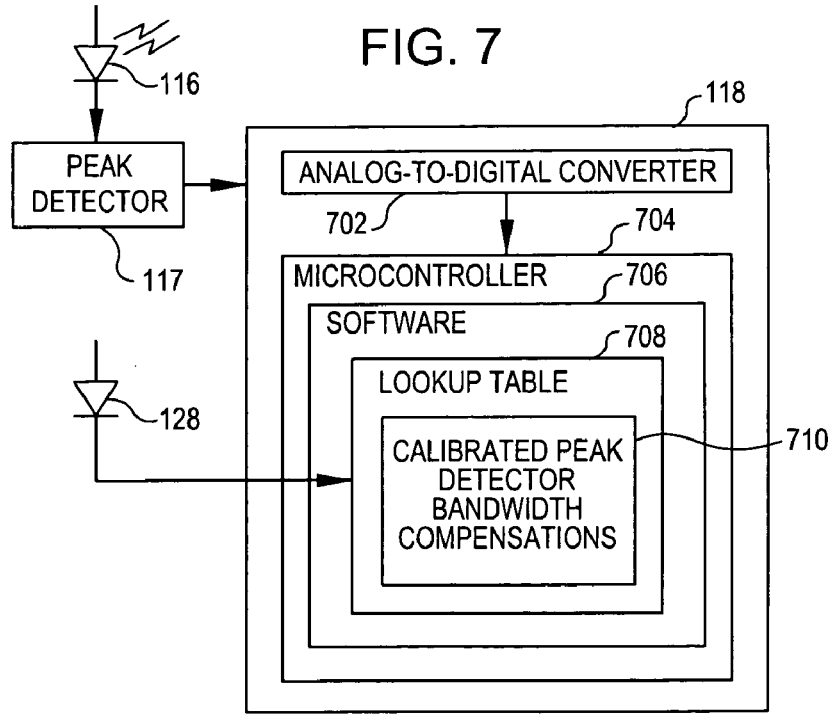
FIG. 7 is a high-level block diagram showing operation of the bandwidth processor depicted in FIG. 1 according to an embodiment of the present invention.

Returning back to the flowchart 300, in a block 310, measurements are made from the illuminated monitor photodiode 116 by the peak detector 117 and coupled to the bandwidth processor 118. The bandwidth processor 118 compensates the output from the peak detector 117 (e.g., amplitude for logic level "1") in response to bandwidth variations. FIG. 7 is a high-level block diagram showing operation of the bandwidth detector 118 according to an embodiment of the present invention. The example bandwidth processor 118 includes an analog-to-digital converter 702 coupled to a microcontroller 704. The microcontroller 704 runs software 706, which has a lookup table 708. The lookup table 708 includes calibrated peak detector bandwidth compensations 710 and is indexed from the reference photodiode 128's bandwidth measurement.

In a block 312, the adjusted logic level "1" amplitude is coupled to the laser modulation circuitry 122, which generates laser modulation voltage adjusted in response to the bandwidth variations of the substrate 130. The adjusted laser modulation voltage is applied to the laser 102 to adjust the extinction ratio and/or the optical modulation amplitude of the optical beam 104.

Figure 8:
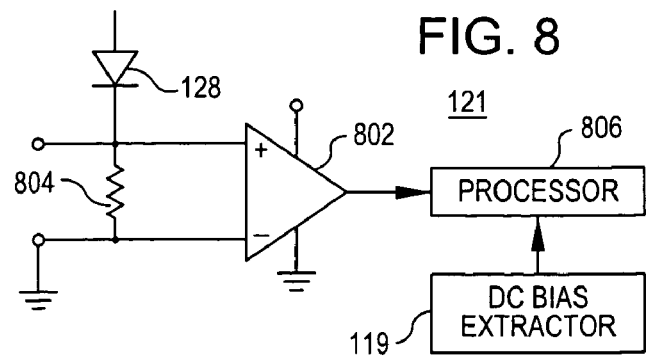
FIG. 8 is a schematic diagram of the temperature processor depicted in FIG. 1 according to an embodiment of the present invention.

In a block 314, the temperature processor 121 derives the temperature of the laser system 100 using the reference photodiode 128. FIG. 8 is a schematic diagram of the temperature processor 121 according to an embodiment of the present invention. The temperature processor 121 includes a buffer 802 having a resistor 804 coupled across it positive and negative inputs. A processor 806 is coupled to the output of the buffer 802. In one embodiment, the processor 806 may include of an analog-to-digital converter (not shown), and a microprocessor or microcontroller (not shown). After reading the description herein, a person of ordinary skill in the relevant art will readily recognize how to implement embodiments of the present invention using an analog-to-digital converter and a microprocessor or microcontroller.

The buffer 802 may be a single-ended operational amplifier. Alternatively, the buffer 802 may be a log amplifier. The resistor 804 is a sense resistor.

Figure 9:
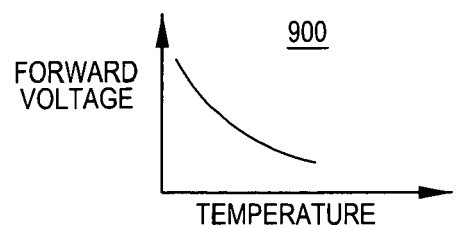
FIG. 9 is a graphical representation of the relationship between temperature and current for the laser diode given a constant light out depicted in FIG. 1 according to an embodiment of the present invention.

The threshold voltage of the reference photodiode 128 is directly proportional to the current through the reference photodiode 128 and current changes as a function of temperature. FIG. 9 is a graphical representation of the relationship between temperature and current for the reference photodiode 128 according to an embodiment of the present invention. The threshold voltage of the reference photodiode 128 thus changes as a function of temperature.

The reference photodiode 128 has a characteristic curve that illustrates forward voltage versus temperature for the reference photodiode 128. The concept of characteristic curves is well known. The temperature processor 121 measures the forward voltage of the reference photodiode 128. The processor 806 correlates the forward voltage with the current using the characteristic curve. The processor 806 then correlates the voltage with temperature using the graphical representation in FIG. 9.

Returning back to the flowchart 300, in a block 316, the processor 806 adjusts the output from the DC bias extractor 119 (e.g., the DC bias level) in response to temperature variations. The processor 806 adjusts the laser bias level to maintain a constant DC monitor photodiode 116 current for a given laser 102 light output over temperature and age. The processor 806 may include a microprocessor (not shown) implementing any suitable known Proportional-Integral-Differential (PID) loop control algorithm to maintain constant monitor photodiode 116 current.

In a block 318, the adjusted peak detector 117 output level (e.g., adjusted voltage proportional to the amplitude for the logic level "1" of the optical beam 112) is coupled to the laser modulation circuitry 122. The laser modulation circuitry 122 generates laser modulation current swing. The laser modulation current swing determines, in conjunction with DC bias current, the amplitude of the logic level "1" in the eye diagram 200. The control voltage that determines the modulation current swing is generated from the bandwidth processor 118 and the peak detector 117. The bandwidth processor 118 basically maintains (via software control loops) constant optical modulation amplitude (OMA) at the monitor photodiode 116 through this feedback system.

Figure 10:
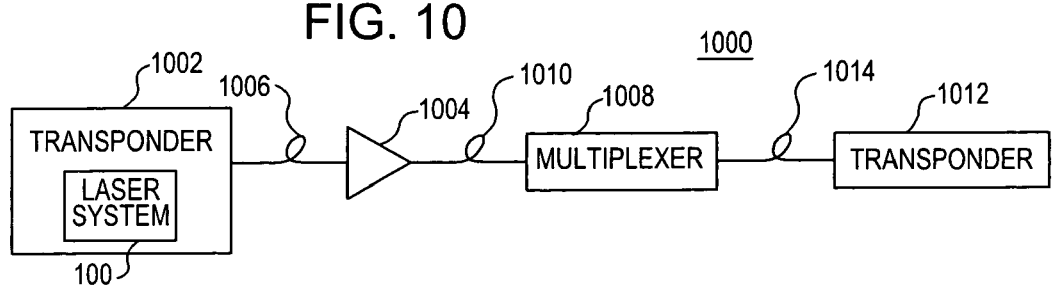
FIG. 10 is a high-level block diagram of a communication system according to an embodiment of the present invention.

FIG. 10 is a high-level block diagram of a communication system 1000 according to an embodiment of the present invention. The system 1000 includes a transponder 1002 coupled to an optical amplifier 1004 via an optical fiber 1006. The optical amplifier 1004 is coupled to a multiplexer 1008 via an optical fiber 1010. The multiplexer 1008 is coupled to a transponder 1012 via an optical fiber 1014.

The transponder 1002 includes the laser system 100. Although only one transponder 1002, optical amplifier 1004, optical fibers 1006, 1010, and 1014, multiplexer 1008, and transponder 1012 are shown, it is common to have numerous transponders, optical amplifiers, optical fibers, and multiplexers in optical communication systems. Single units are shown for simplicity.

The transponder 1002 may transmit optical beams generated by the laser 100. Although not shown for purposes of simplicity, the transponder 1002 also may receive optical beams from the transponder 1010.

The optical amplifier 1006 may be an erbium (Er) doped fiber, amplifier (EDFA). Alternatively, the optical amplifier 1006 may be an ytterbium (Yb) doped fiber amplifier, a praseodymium (Pr) doped fiber amplifier, a neodymium (Nd) doped fiber amplifier, or other suitable optical amplifier.

The multiplexer 1008 may be a DWDM multiplexer. Alternatively, the multiplexer 908 may be an add-drop multiplexer.

Although embodiments of the present invention are described with respect to a distributed feedback (DFB) laser, it is to be understood that various embodiments may be implemented using vertical cavity surface emitting lasers (VCSEL) or other suitable lasers. After reading the description herein, persons of ordinary skill in the relevant art will readily recognize how to implement embodiments of the present invention using VCSELs or other suitable (e.g., edge emitting) lasers. For example, an optical beam is emitted from a top facet of a VCSEL and is backscattered from the lens onto the monitor photodiode.

The above description of illustrated embodiments of the invention is not intended to be exhaustive or to limit embodiments of the invention to the precise forms disclosed. While specific embodiments of, and examples for, the invention are described herein for illustrative purposes, various equivalent modifications are possible, as those skilled in the relevant art will recognize. These modifications can be made in light of the above detailed description.

In the above description, numerous specific details, such as particular processes, materials, devices, and so forth, are presented to provide a thorough understanding of embodiments of the invention. One skilled in the relevant art will recognize, however, that the embodiments of the present invention can be practiced without one or more of the specific details, or with other methods, components, etc. In other instances, well-known structures or operations are not shown or described in detail to avoid obscuring the understanding of this description.

Various operations have been described as multiple discrete operations performed in turn in a manner that is most helpful in understanding embodiments of the invention. However, the order in which they are described should not be construed to imply that these operations are necessarily order dependent or that the operations be performed in the order in which the operations are presented.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A method, comprising:
    converting an optical beam emitted by a laser into current proportional to a power in the optical beam using a first photodiode on a substrate, the first photodiode being illuminated by the optical beam;
    evaluating a bandwidth of the substrate using a second photodiode on the substrate; preventing the second photodiode from being illuminated by the optical beam;
    extracting an amplitude for logic level "1" of the optical beam using a peak detector coupled to the first photodiode and compensating the amplitude for the logic level "1" in response to the evaluated bandwidth; and
    adjusting laser modulation voltage in response to the compensated amplitude for the logic level "1".

2. The method of claim 1, further comprising adjusting optical signal alternating current (AC) components.

3. The method of claim 2, further comprising adjusting optical signal extinction ratio based on the adjusted laser modulation voltage.

4. The method of claim 2, further comprising adjusting optical signal optical modulation amplitude based on the adjusted laser modulation voltage.

5. The method of claim 1, wherein extracting an amplitude for the logic level "1" comprises extracting an amplitude for the logic level "1" of the optical beam using a peak detector coupled to the first photodiode.

6. An apparatus, comprising:
    a laser;
    a first photodiode on a substrate, the first photodiode being illuminated by an optical beam emitted by the laser;
    a second photodiode on the substrate, the second photodiode being prevented from illumination by the optical beam; and
    first circuitry coupled to the first photodiode to adjust alternating circuit (AC) components in the optical beam in response to variations in bandwidth of the second photodiode.

7. The apparatus of claim 6, wherein the first circuitry includes laser modulation circuitry coupled to adjust laser modulation voltage in response to variations in bandwidth of the second photodiode.

8. The apparatus of claim 7, wherein the first circuitry is further to adjust extinction ratio of the optical signal in response to variations in bandwidth of the second photodiode.

9. The apparatus of claim 6, wherein the first circuitry is further to adjust optical modulation amplitude of the optical signal in response to variations in bandwidth of the second photodiode.

10. A system, comprising:
    a transponder having a laser to emit an optical beam, a substrate having a first photodiode and a second photodiode, the first photodiode being illuminated by the optical beam, the second photodiode being prevented from illumination by the optical beam, and first circuitry coupled to the first photodiode to adjust alternating circuit (AC) components in the optical beam in response to variations in bandwidth of the second photodiode; and an erbium-doped fiber amplifier (EDFA) coupled to the transponder.

11. The system of claim 10, further comprising a multiplexer coupled to the EDFA.

12. The system of claim 11, further comprising an add-drop multiplexer coupled to the EDFA.

13. An article of manufacture, comprising: a machine-accessible medium including data that, when accessed by a machine, cause the machine to perform the operations, comprising:
    converting an optical beam emitted by a laser into current proportional to a power in the optical beam using a first photodiode on a substrate, the first photodiode being illuminated by the optical beam;
    evaluating a bandwidth of the substrate using a second photodiode on the substrate;
    preventing the second photodiode from being illuminated by the optical beam;
    extracting an amplitude for logic level "1" of the optical beam using a peak detector coupled to the first photodiode and compensating the amplitude for the logic level "1" in response to the evaluated bandwidth; and
    adjusting laser modulation voltage in response to the compensated amplitude for the logic level "1".

14. The article of manufacture of claim 13, wherein the machine-accessible medium further includes data that cause the machine to perform operations comprising adjusting optical signal alternating current (AC) components.

15. The article of manufacture of claim 14, wherein the machine-accessible medium further includes data that cause the machine to perform operations comprising adjusting optical signal extinction ratio based on the adjusted laser modulation voltage.

16. The article of manufacture of claim 13, wherein the machine-accessible medium further includes data that cause the machine to perform operations comprising adjusting optical signal optical modulation amplitude based on the adjusted laser modulation voltage.

17. The article of manufacture of claim 13, wherein the machine-accessible medium further includes data that cause the machine to perform operations comprising extracting an amplitude for the logic level "1" of the optical beam using a peak detector coupled to the first photodiode.

* * * * *